United States Patent [19]

Kohl

[11] 4,317,342

[45] Mar. 2, 1982

[54] SLIDE FRAME FOR A WARP KNITTING MACHINE

[75] Inventor: Karl Kohl, Obertshausen, Fed. Rep. of Germany

[73] Assignee: Sulzer Brothers Limited, Winterthur, Switzerland

[21] Appl. No.: 154,933

[22] Filed: May 30, 1980

[30] Foreign Application Priority Data

Jun. 26, 1979 [CH] Switzerland .................. 6072/79

[51] Int. Cl.³ .................. D04B 35/04; D04B 23/00
[52] U.S. Cl. .................. 66/120; 66/203
[58] Field of Search .................. 66/203, 120

[56] References Cited

U.S. PATENT DOCUMENTS 3,952,551 4/1976 Kohl .................. 66/120
4,222,249 9/1980 Winter .................. 66/120

Primary Examiner—Ronald Feldbaum
Attorney, Agent, or Firm—Kenyon & Kenyon

[57] ABSTRACT

The slide frame of the warp knitting machine is secured via a spacer element of light weight construction on the slide bar. The spacer means is in the form of a plurality of elongate plates which are resilient in the longitudinal direction of the slide frame or in the form of a single one piece perforated plate.

10 Claims, 3 Drawing Figures

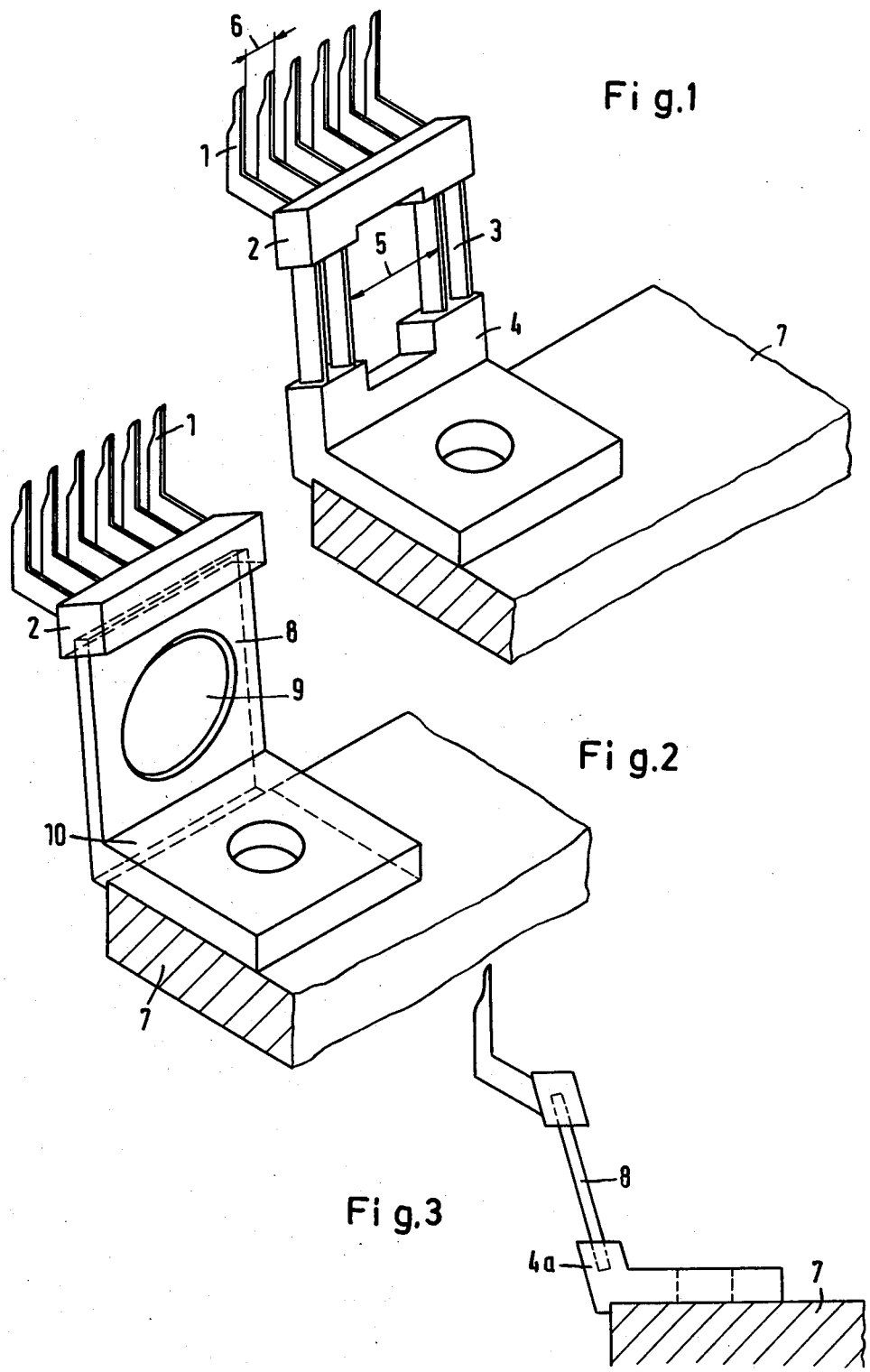

SLIDE FRAME FOR A WARP KNITTING MACHINE

This invention relates to a slide frame for a warp knitting machine.

As is known, various types of warp knitting machines are provided with a slide bar which carries a slide frame and which is disposed substantially level or lower than a needle bar of the machine. In one known type of machine, e.g. a Liba-Racpp machine, a plurality of slides are secured in groups in a slide frame, such as by casting. In addition, the frame is, in turn, adjustably and releaseably secured to a slide bar of the knitting machine. However, one disadvantage of such a machine is that the resulting slide frame is large and particularly heavy. Hence, when the machine is operating at a fast speed, large inertial forces have to be compensated.

Accordingly, it is an object of the invention to provide a slide assembly which produces relatively small inertial forces during operation.

It is another object of the invention to provide a slide assembly which is constructed in a relatively simple manner.

It is another object of the invention to provide a slide assembly for a warp knitting machine which is relatively small and of light weight construction.

Briefly, the invention provides a slide assembly for a warp knitting machine which is comprised of an elongated slide bar, a slide frame for mounting a plurality of slides therein and spacer means mounting the slide frame on the slide bar. The spacer means is constructed, in one embodiment, of a plurality of elongated elements each of which is resilient longitudinally of the slide frame.

In another embodiment, the spacer means is constructed, as a perforated plate.

The slide assembly may also include a bottom frame which is secured to the slide bar. In this embodiment, one end of the spacer means is secured in the slide frame while the opposite is secured in the bottom frame. Further, the bottom frame may be bent to accommodate seating on the slide bar.

These and other objects and advantages of the invention will become more apparent from the following detailed description and appended claims taken in conjunction with the accompanying drawings in which:

FIG. 1 illustrates a perspective view of a slide assembly constructed in accordance with the invention;

FIG. 2 illustrates a perspective view of a modified slide assembly in accordance with the invention; and FIG. 3 illustrates an end view of a further embodiment of a slide assembly in accordance with the invention.

Referring to FIG. 1, the slide assembly is constructed for use in a warp knitting machine. As shown, the slide assembly includes an elongated slide bar 7 which is mounted within the warp knitting machine is known manner. In addition, the slide assembly includes at least one slide frame 2 for mounting a plurality of slides 1 therein and a spacer means mounting the slide frame 2 on the slide bar 7 via a bottom frame 4.

The slides 1 are mounted on the frame 2 in planes perpendicular to the longitudinal axis of the slide bar 7 and are disposed in spaced apart relation at a uniform spacing 6. The slides 1 are formed of any suitable shape and material. The slide frame 2 is, in turn, formed of any suitable cast material for mounting of the slides 1 therein and constitutes a block-like element. The bottom frame 4 is likewise of block shape or single piece construction which can be secured to the slide bar 7 in any suitable fashion as is known. As shown, the bottom frame is apertured so as to permit a bolt or the like to pass therethrough into the slide bar 7.

The spacer means is in the form of a plurality of elongate elements 3. As shown, each elongate element 3 is in the form of a thin light weight plate which is secured or cast into and between the slide frame 2 and the bottom frame 4. These plates are resilient in the longitudinal direction of the frame 2 and are spaced apart in groups at spacings which are several times as large as the slide spacing 6. Alternatively, the elongate elements may be in the form of pins.

Referring to FIG. 2, wherein like reference characters indicate like parts as above, the spacer means for mounting the slide frame 2 on the slider bar 7 is in the form of a one piece thin light-weight plate 8 which is secured at the top to the frame 2 and which is bent with a bent portion 10 secured to the slide bar 7. As shown, the plate 8 is perforated with a central opening 9. This perforation 9 reduces the resistance and weight of the plate 8 and facilitates assembly and adjustment of the knitting tools (not shown).

Referring to FIG. 3, wherein like reference characters indicate like parts as above, the perforated plate 8 may be held in a separate bottom frame 4a which is secured to the slide bar 7.

The invention thus provides a slide assembly of lightweight construction which is subject to reduced inertial forces which are generated during operation of a warp knitting machine. In this regard, the slides 1 which are mounted on the slide bar 7 do not require large one piece castings or blocks for mounting.

What is claimed is:

1. A slide assembly for a warp knitting machine comprising
   an elongated slide bar,
   a slide frame for mounting a plurality of slides therein, and
   spacer means mounting said slide frame on said slide bar.

2. A slide assembly as set forth in claim 1 wherein said spacer means comprises a plurality of elongate elements.

3. A slide assembly as set forth in claim 2 wherein each element is a plate, each said plate being resilient longitudinally of said slide frame.

4. A slide assembly as set forth in claim 1 wherein said spacer means is a plate.

5. A slide assembly as set forth in claim 4 wherein said plate is perforated.

6. A slide assembly as set forth in claim 1 which further comprises a bottom frame secured to said slide bar and wherein one end of said spacer means is secured in said slide frame and an opposite end is secured in said bottom frame.

7. A slide assembly as set forth in claim 6 wherein said bottom frame is bent.

8. A slide assembly for a warp knitting machine comprising
   a slide bar elongated along a longitudinal axis thereof;
   a slide frame;
   a plurality of slides mounted on said frame in planes perpendicular to said slide bar axis; and
   spacer means mounting said frame on said slide bar in spaced relation thereto, said spacer means including at least one thin light-weight plate secured between said frame and said bar.

9. A slide assembly as set forth in claim 8 wherein said plate is of rectangular shape and perforated.

10. A slide assembly as set forth in claim 8 wherein said spacer means comprises a plurality of said plates, said plates being disposed in spaced parallel relation and being resilient longitudinally of said frame.

* * * * *

UNITED STATES PATENT AND TRADEMARK OFFICE
CERTIFICATE OF CORRECTION

PATENT NO. : 4,317,342
DATED : March 2, 1982
INVENTOR(S) : Karl Kohl

It is certified that error appears in the above—identified patent and that said Letters Patent is hereby corrected as shown below:

Column 1, line 11, change "Liba-Racpp" to --Liba-Racop--

Signed and Sealed this

First Day of June 1982

[SEAL]

Attest:

Attesting Officer

GERALD J. MOSSINGHOFF
Commissioner of Patents and Trademarks